March 23, 1926. 1,577,982
J. W. PEARSON
GEARING
Filed Dec. 12, 1921 3 Sheets-Sheet 1
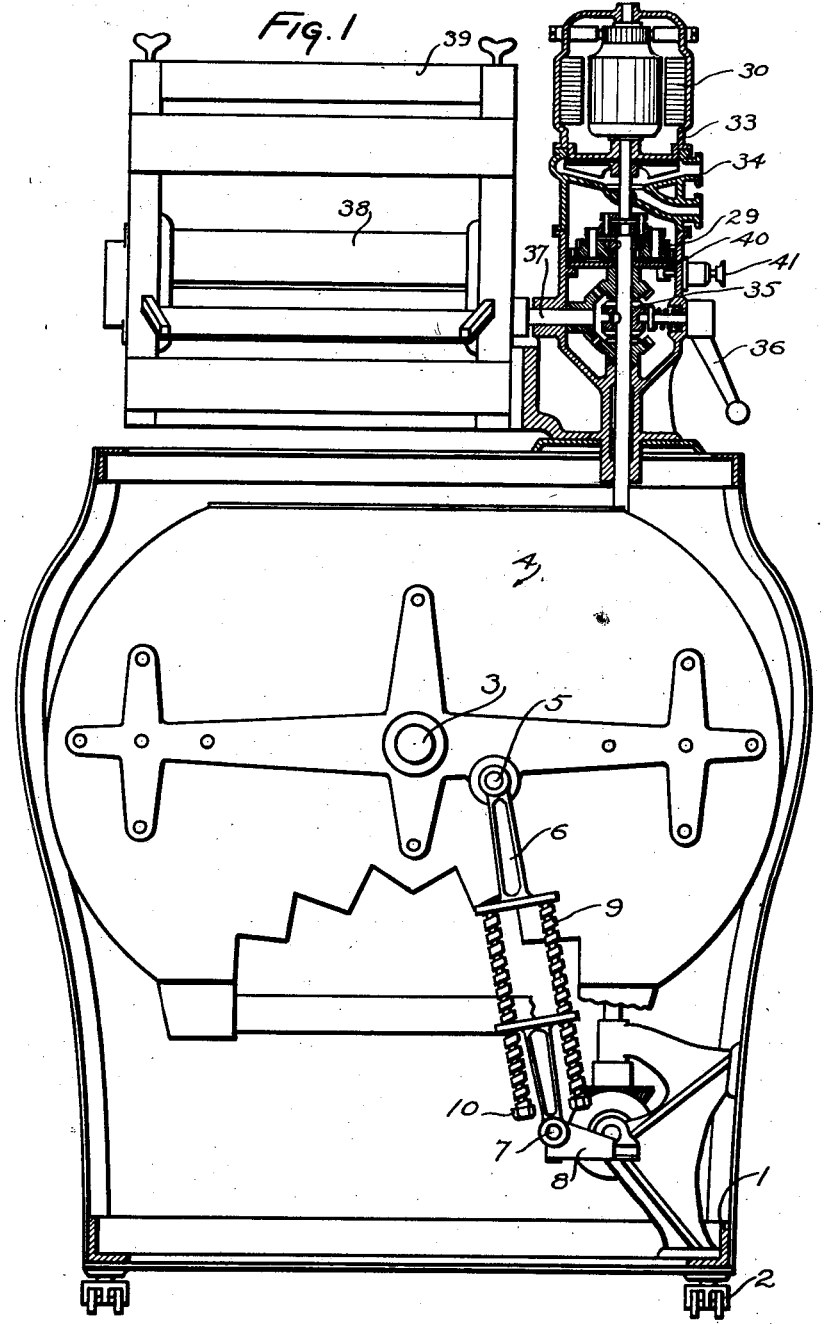

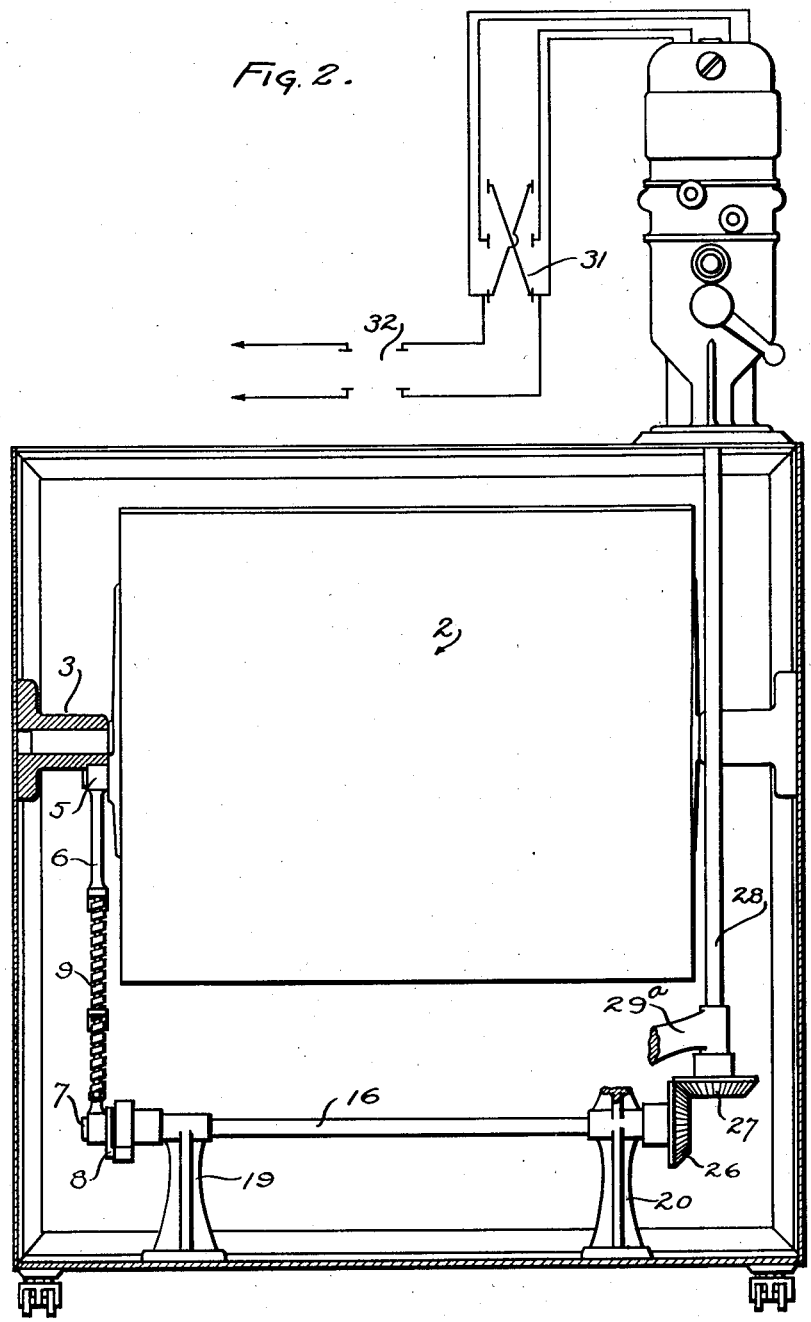

March 23, 1926.　　　　　J. W. PEARSON　　　　　1,577,982
GEARING
Filed Dec. 12, 1921　　　3 Sheets-Sheet 3
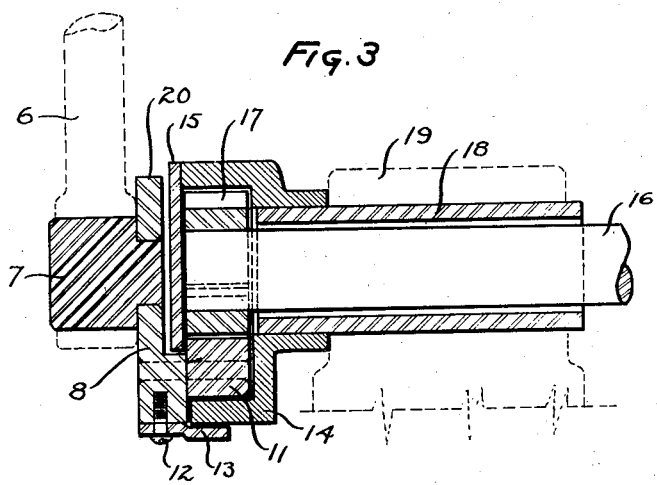
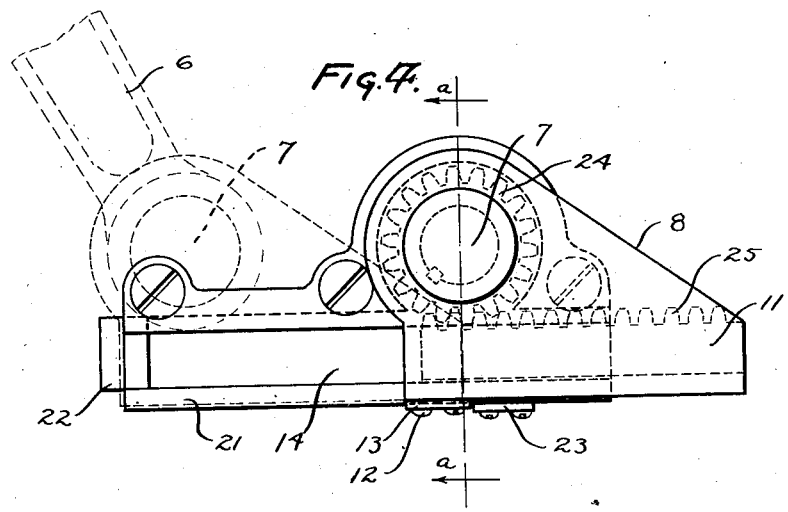
INVENTOR
John W. Pearson
BY Toulmin & Toulmin
ATTORNEYS Patented Mar. 23, 1926.

1,577,982

UNITED STATES PATENT OFFICE.

JOHN W. PEARSON, OF DAYTON, OHIO, ASSIGNOR TO THE DAVIS SEWING MACHINE COMPANY, OF DAYTON, OHIO, A CORPORATION OF DELAWARE.

GEARING.

Application filed December 12, 1921. Serial No. 521,680.

*To all whom it may concern:*

Be it known that I, JOHN W. PEARSON, a citizen of the United States, residing at Dayton, in the county of Montgomery and State of Ohio, have invented certain new and useful Improvements in Gearing, of which the following is a specification, reference being had therein to the accompanying drawing.

My invention relates to power mechanism, and in particular to mechanism which will reciprocate a driven part in varying degrees while traveling in one direction and bring the driven part to substantial rest while turning in the other direction.

The particular adaptation illustrated of my invention is that of a washing machine of the domestic power type. The object of my invention is to provide a mechanism which will eliminate the necessity for a clutch for throwing into and out of engagement the driven mechanism when the direction of motion of the driving member is changed. It is also my object to be able to bring to rest or to operate driven mechanism by a change in direction of the driving means.

In a washing machine it is of particular advantage to eliminate the clutch and to be able to reciprocate a tub while the driving shaft is turning in one direction and by reversing the direction of power without cutting off the source of power to be able to bring the tub to rest and still be able to operate the wringer. It is also a matter of advantage to be able to operate the wringer without the resistance due to driving the tub so that no torque will be set up which will move the wringer about the axis of its vertical driving shaft and thus squeeze the operator between the tub and the wringer. My invention accomplishes this object because the driving shaft connected to the tub may turn freely, there being no movement of the tub imparted to it and therefore no resistance so that no torque is set up which will in turn move the wringer about its vertical driving axis.

It will be understood that my invention is applicable to a variety of different types of mechanism and that I have shown it in connection with a washing machine as an illustration of one of its practical embodiments.

It is a further object of my invention to provide a variable throw mechanism which in one part of its revolution will have a maximum movement and in another part of its movement will return to zero, describing under varying conditions of resistance at its point of connection between the reciprocated member and the crank member an ovate or a parabolic path or paths of varying configurations depending upon the relative resistance between the driven part and the driving part. It is my object to provide a mechanism which will move from zero to the point of maximum movement and return at varying times in the course of a revolution and which will be maintained at substantially zero and substantially at rest when the driving part is turning in the other direction. It is also my object to combine this mechanism with a flexible driving means which will absorb the shocks, stresses and strains incident to its operation and which will accommodate for the alinement of the parts and the torsional strains and which will absorb whatever minor movement there may be when the parts are in a position of substantial rest.

Referring to the drawings:

Fig. 1, is a side elevation of a complete washing machine with my mechanism installed;

Fig. 2, is an end elevation of a washing machine with one side thereof removed and also showing the electrical connections to the split phase motor;

Fig. 3, is an enlarged section on the line a—a of Fig. 4, of the driving mechanism;

Fig. 4, is an end elevation enlarged of the driving mechanism showing the mechanism in its zero and maximum movement positions.

Referring to the drawings, 1 is a washing machine frame mounted upon rollers 2. In this frame is journaled at 3 a tub 4 of any desired character, designed to be reciprocated about 3. To this tub is pivoted at 5 a flexible connecting rod 6 such as shown in the co-pending application No. 420,113. A flexible connecting rod is not essential, but it is a matter of advantage in a mechanism of this character. This connecting rod is connected at 7 to the crank member 8. The connecting rod itself is composed of a pair of elements interconnected through the helical springs 9 and guide bolts 10. The crank member 8 is composed of a rack 11 to which is connected by the screw 12 a guard or guide 13 that embraces between the bottom of the rack 11 and itself the housing 14. This housing 14 has an end plate 15 that encases the end of the driving shaft 16 and the gear 17 mounted thereon and turning therewith within the tubular casing 18 which is supported in any desired way as for instance by the bracket 19. This rack 11 has an outwardly and upwardly projecting plate 20 upon which is mounted the driven part 6 on the stud 7. The mounting is pivotal. The casing 14 is projected laterally as at 21 to form an extended guideway or track for the passage of the rack 11 with a stop 22 at one end to limit the movement of the rack in that direction. The stop 23 carried by the casing 14 comes in contact with the stop 13 on the rack when it is moved in the other or right hand direction, as will be seen from Figure 4. When the parts are in position as shown in full lines in Figure 4, the movement of the driven member is substantially zero while when the parts are in the position shown in the dotted lines or in the position shown in Figure 1, there is a maximum of movement.

It will be readily appreciated that as the shaft 16 turns clockwise that the teeth 24 engaging with the teeth 25 of the rack 11 will drive the rack 11 together with its driven part 6 to the left hand and when the full extent of that movement has taken place, then the outer end of the crank member 8 will lift so that the point of connection of 6 with 8 as at 7 will start to travel about the center of the driving shaft 16. At a point in the stroke, usually above and to the right hand of the driving shaft 16, the full extent of the stroke will have been accomplished and as the end of 8 starts to travel downwardly it will be drawn inwardly due to the resistance to its movement in that direction as will sometimes happen, while in other instances it will make a full stroke completely about the center of 16 as a center and at the same distance therefrom.

If the mechanism is started from the other direction so that 16 turns in an anti-clockwise direction, then the rack 11 will be brought to the position shown in full lines in Figure 7, and 7 will substantially coincide with the end of 16 and substantially no movement will be imparted to 6 as the right hand end of 8 moves about 16 as a center while the left hand end substantially coincides with the end of 16.

Referring to Figure 2, it will be seen that the driving shaft 16 is supported in the bracket 19 at one end and the bracket 19' at the other. Upon the right hand end of 16 is mounted a bevel gear 26 meshing with another bevel gear 27 carried by a vertical driving shaft 28 in a bracket 29ª affixed to the frame 1 of the casing. This shaft 28 is driven through suitable reduction gearing 29 by a split-phase motor 30, the wiring of which is seen in Figure 2. 31 is a switch of any well known type for reversing the direction of motion of the motor 30. 32 is a fuse in the line to protect the mechanism.

The motor 30 is mounted in a frame 33. 34 is a centrifugal pump also mounted in this frame. Clutch mechanism 35 is operated by the handle 36 for throwing into and out of engagement the wringer shaft 37 which drives the wringer rolls 38 of the wringer 39.

When it is desired to operate the washer tub, the parts will assume the position shown in Figure 1 and the tub will be reciprocated about its center 3. When it is desired to operate the wringer the tub is brought to rest by reversing the direction of motion of the driving shafts by throwing the switch 31. This results in 8 merely rotating freely in the bearing of 6 at 7 without moving the tub and without any resistance being interposed to the movement of 16. The clutch 35 is then thrown into engagement by the arm 36 and the wringer rolls started, but no torque will be set up to move the wringer about 28 because there is no resistance to the movement of the shaft 28 to cause this torque. If the clothes that are being run through the wringer 38 jam the wringer and thereby endanger the mechanism then the reduction gearing will be moved about on its plate 40 and the switch 41 actuated to cut out the power, but this is not essential to my invention and is only of incidental interest as it is covered by other applications.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

1. Apparatus of the character described comprising, in combination, a driven member; a driving member, means for operating said driving member in opposite directions; and means operably connecting said driving and driven members, comprising an automatically variable length crank constructed to cause actuation of the driven member when the driving member is driven in one direction but to cause no movement of the driven member when the driving member is operated in the reverse direction.

2. In combination, a driving means, a reversible rotary driven member, an intermediate automatically variable length connecting mechanism between the aforesaid driving means and driven member constructed to vary the location of the point of connection of the driven member and intermediate connecting mechanism from a point coincident with the axis of the driving means to varying positions away from said axis and about it while the driving means is revolving in one direction, and to maintain the point of connection of the driven member and intermediate connecting mechanism substantially on the axis of the driving means when said means is turning in the other direction.

3. Apparatus of the character described, comprising, in combination, a driven member; a reversely rotatable driving member, means for operating said driving member in opposite directions; a connecting mechanism at all times during operation connecting the driving member and the driven member, said connecting mechanism comprising a member of variable length, and means to automatically vary the length thereof to adjust the center of connection of the said variable length member to the driving means so that the effective length of said variable length member will vary from substantially zero effective length to maximum effective length thereof, whereby the driven means is actuated when the driving means is rotated in one direction, and is held substantially stationary when the driving means is rotated in the opposite direction.

4. Apparatus of the character described, comprising, in combination, a driven member; a driving shaft, a support therefor, means for rotating the said shaft in opposite directions; and connecting mechanism for operably connecting the said shaft to the driven member, said connecting mechanism comprising a member operably connected to the end of the driving shaft and constructed to be shifted during rotation of the said shaft transversely to the major axis of the shaft, means associated with said member for guiding and limiting the transverse motion of the said member, and connecting means pivotally connecting the said transversely moving member and the driven member, the construction being such that the driven member will be actuated as the driving shaft is rotated in one direction, but will receive substantially no movement from the driving shaft when that shaft is rotated in the opposite direction.

5. In combination, a driving shaft, a driving means on the one end of said shaft, a transverse member having a driven means carried thereon to engage with the driving means on the driving shaft, means to limit the lateral motion of the driven means in its extreme positions, a pivotal connection on said driven means, a driven member mounted thereon the transverse member having means to automatically vary the effective length thereof and the positioning of the driven means to cause the driven means to be actuated in one position of the driven means and to be held in position of substantial rest in the other position of the driven means.

6. In combination, a driving shaft, a pinion on one end thereof, a casing surrounding said pinion and said driving shaft, means to support said casing so that it can rotate therein, a rack guided by said casing and limiting its extreme movements, said rack engaging with said pinion within said casing, a member carried by said rack, a stud carried by said member, a driven member pivoted thereon, whereby as the shaft turns in one direction the pivotal connection of the driven member will be moved with the rack to its extreme outward position and will revolve about the driving shaft as a center, together with the casing; and in the other direction of motion of the driving shaft the pivotal connection will be brought substantially coincident with the axis of the driving shaft and no motion will be imparted to the driven member while the casing and rack revolve about the axis of the driving shaft.

7. In a washing machine, a source of power, a reversible rotary drive shaft connected thereto, a tub, and interconnecting means between said tub and said driving shaft comprising an automatically variable length crank arm to reciprocate the tub in one direction of motion of the driving shaft and to maintain it in position of substantial rest in the other direction of motion of the driving shaft.

8. In combination in a washing machine, a source of power, means for reversing the direction of motion of the source of power, a driving shaft driven by said source of power, a tub, and means connecting said driving shaft and tub to one another, said means comprising an automatically variable length crank and being so constructed that when the power source drives the driving shaft in one direction the tub will be actuated through said connecting means, but when the power source drives the driving shaft in the opposite direction the tub will be held substantially stationary.

9. In combination in a washing machine, a source of power, means for reversing the direction of motion of the source of power, a driving shaft driven by said source of power, a tub, means connecting said driving shaft and tub to one another, and mechanism connecting said tub and driving shaft, comprising a variable length member constructed to automatically vary its length in accordance with the direction of rotation of the driving shaft from full length when the driving shaft is rotated in one direction to zero when the shaft is rotated in the opposite direction, the construction of the various parts being such that when the variable length member is of substantially zero length the tub will be held substantially stationary, and when this variable length member is of a length greater than zero length the tub will be actuated.

10. In combination, in a washing machine, a tub pivotally supported in a frame, a frame, means thereon for supporting a source of power, a driving shaft connected to said source of power supported by the frame of the washing machine, a pinion on one end of the driving shaft, a casing embracing said end of the driving shaft in said pinion with an aperture therein, said casing being supported by said frame rotatably therein, a laterally shiftable member having a rack thereon to engage with said pinion and to be guided by said casing, an outwardly extending and upwardly projecting member attached to said rack, a pivotal connection thereon, a conecting rod pivoted on the said pivotal connection at one end and to said tub at the other end to reciprocate said tub, whereby in one direction of motion the rack and the connecting rod will be moved to a position away from the axis of the driving shaft to reciprocate said tub as the rack and casing revolve about the driving shaft and in the other direction of motion of the driving shaft of the point of connection of the laterally shiftable member and the connecting rod will coincide with the axis of the driving shaft, whereby the tub will be held substantially stationary.

11. In combination, a reversible rotary power shaft, a crank operable in both directions by said power shaft, a device operable by said crank, and connections between said crank and power shaft whereby said device is reciprocated on rotation of said shaft in one direction and is held stationary when said shaft is rotated in the other direction.

12. In combination, a reversible rotary power shaft, a device connected eccentrically to said shaft when the shaft is rotated in one direction, and connections between the device and shaft for automatically moving said device concentric with the shaft when the shaft is rotated in the reverse direction.

13. Apparatus of the character described, comprising a driven member, a driving member, means for operating said driving member in opposite directions; and means for at all times connecting said driving and driven members, said means comprising a variable length crank constructed to automatically adjust itself to give full length leverage when the shaft is rotated in one direction, with consequent actuation of the driven member, and to give an adjustment of substantially no leverage when the shaft is rotated in the opposite direction, with consequent lack of actuation of the driven member.

14. Apparatus of the character described comprising, in combination, a driven member, a driving member, means for operating said driving member in opposite directions, means operably connecting said driving and driven members comprising a variable length crank arm and means for varying the effective length of the crank arm while the apparatus is in motion to increase or decrease the movement of the driven member.

In testimony whereof, I affix my signature.

JOHN W. PEARSON.